United States Patent [19]

Anderson

[11] 4,265,114

[45] May 5, 1981

[54] LIQUID LEVEL INDICATOR FOR A RESERVOIR

[76] Inventor: Nicholas Anderson, 3234 Clifton Ave., Baltimore, Md. 21216

[21] Appl. No.: 84,612

[22] Filed: Oct. 15, 1979

[51] Int. Cl.[3] ............... G01F 23/12; G01R 33/00; G01B 7/00
[52] U.S. Cl. ............................ 73/313; 73/308; 324/204; 338/32 R
[58] Field of Search .......... 73/313, 308, 319, DIG. 5; 310/103; 338/32 R

[56] References Cited

U.S. PATENT DOCUMENTS

| | | | |
|---|---|---|---|
| 2,026,299 | 12/1935 | Boyd | 324/204 X |
| 3,154,946 | 11/1964 | Ordorica et al. | 340/196 X |
| 3,156,989 | 11/1964 | Atkinson | 340/196X |
| 3,266,312 | 8/1966 | Coleman et al. | 73/313 |
| 3,417,613 | 12/1968 | Barnstorf | 73/313 X |
| 3,783,430 | 1/1974 | Nishiba et al. | 338/32 R |
| 3,993,946 | 11/1976 | Mekino | 338/32 R X |
| 3,994,174 | 11/1976 | Ekman | 73/453 X |
| 4,084,436 | 4/1978 | Smitherman | 73/313 |
| 4,142,079 | 2/1979 | Bachman | 73/313 |
| 4,178,802 | 12/1979 | Yamamoto | 73/313 |

FOREIGN PATENT DOCUMENTS 503335 12/1954 Italy ..................... 73/DIG. 5

*Primary Examiner*—Daniel M. Yasich
*Attorney, Agent, or Firm*—Walter G. Finch

[57] ABSTRACT

The invention is an improved liquid level indicator for the liquid in a reservoir. The invention consists of float mechanism in a framework which permits the float mechanism to be immersed in the liquid in the reservoir and float thereon. The float mechanism magnetically controls a companion device in a hollow enclosure, protected from contact with the liquid in the reservoir. As the level of the liquid in the reservoir changes and the float mechanism follows the changing level of the liquid, it likewise changes the position of the companion device through its magnetic control. The companion device is wired to signal the liquid level at an appropriate read-out site.

8 Claims, 11 Drawing Figures

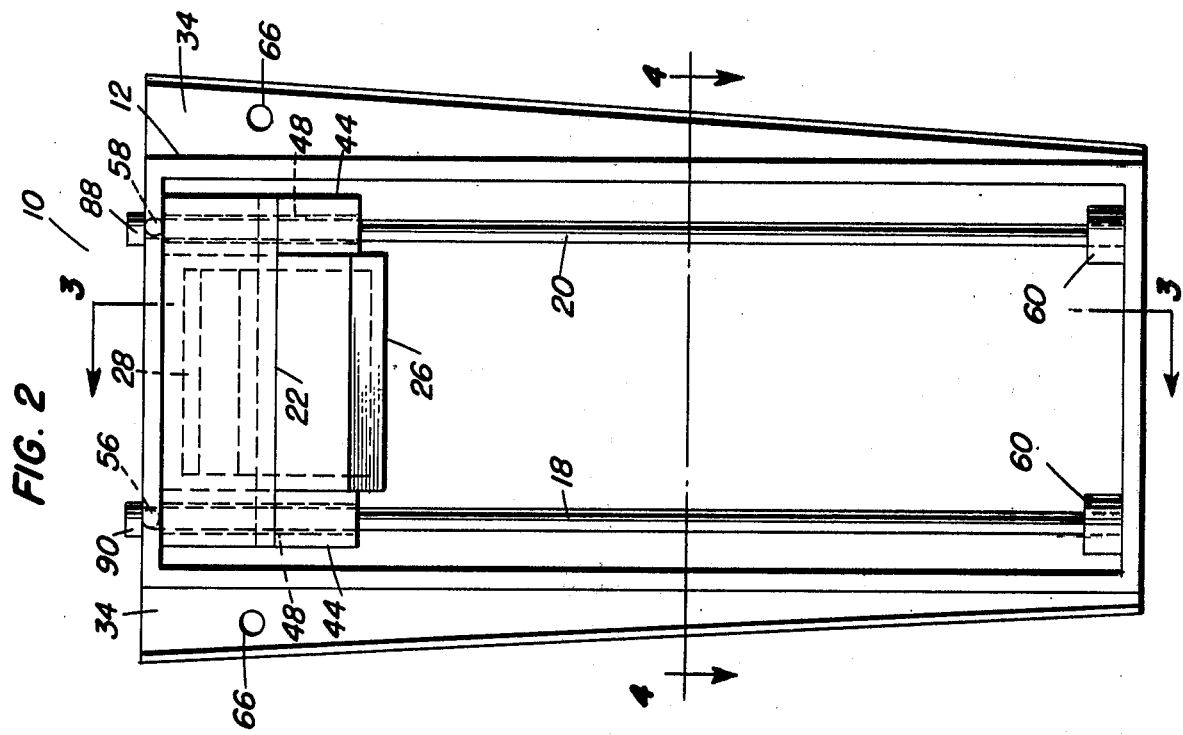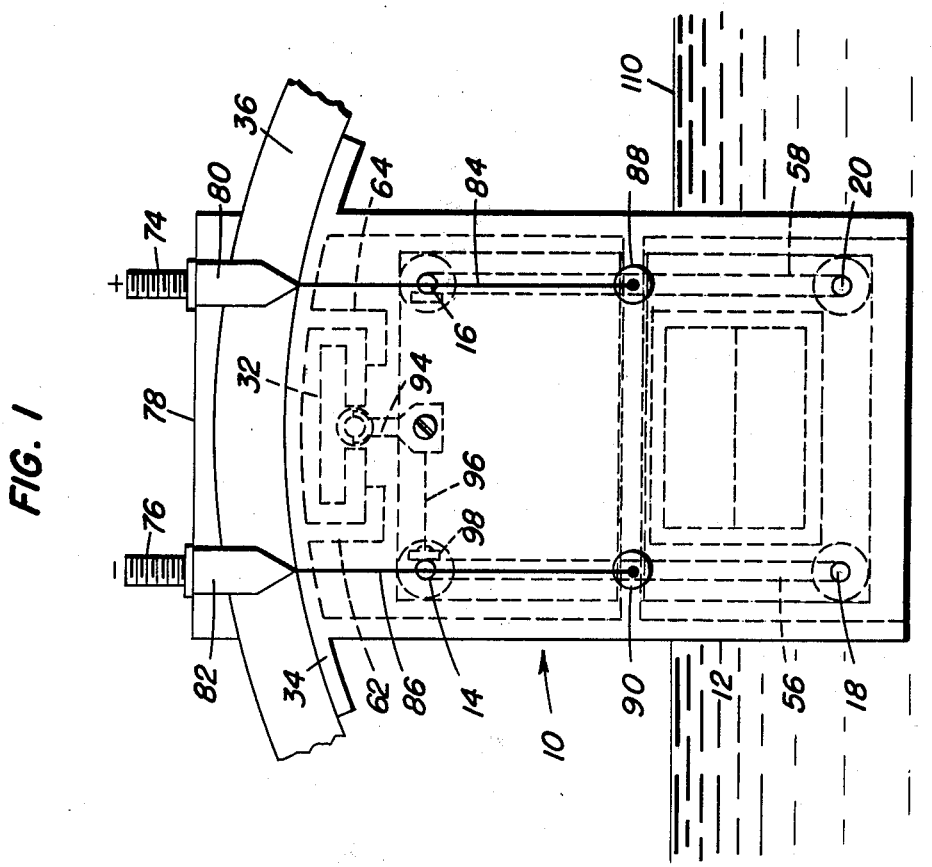

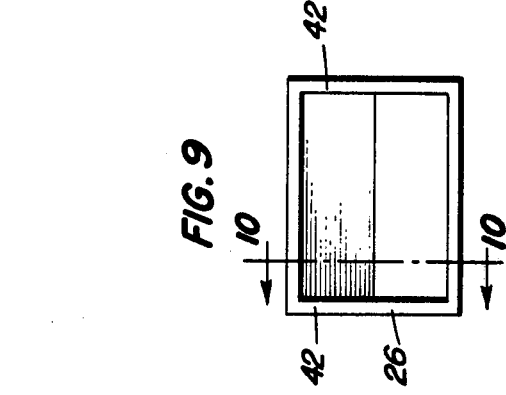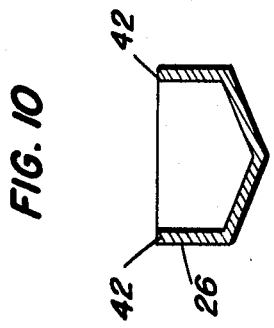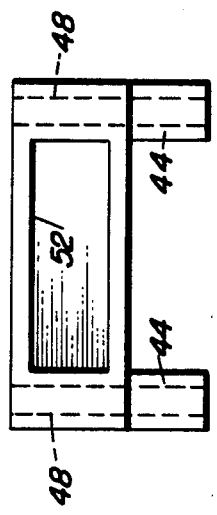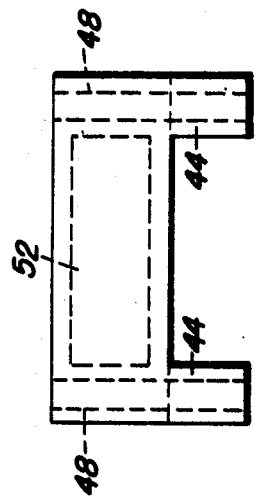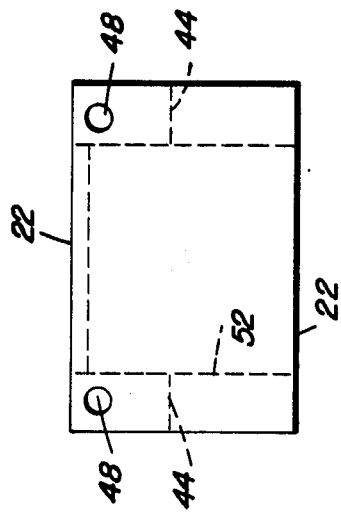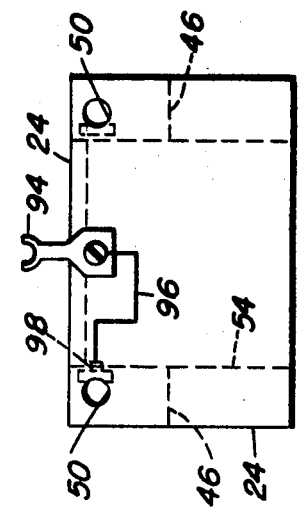

LIQUID LEVEL INDICATOR FOR A RESERVOIR

BACKGROUND AND SUMMARY OF THE INVENTION

The invention relates to gaging devices and in particular to level gaging mechanisms for liquids in a container. Specifically, the invention relates to liquid level indicators for reservoir enclosures.

A need has existed for a reliable indicator for the level of a liquid in an enclosed reservoir that flashes a signal of the exact condition.

In the prior art many such reservoirs have no liquid level indicator at all. Other indicators provide only a general signal, such a light regarding some associated equipment. For example, low liquid in a brake fluid reservoir might merely provide an indication of "brakes". Such signals often are intermittent and can be unreliable or not be interpreted as to the correct meaning.

The present invention overcomes such problems by providing a positive identifiable signal. The present invention is specifically useful for such liquid reservoirs as those for brake fluid, steering mechanism fluid, and other such devices. The device is so designed so that it can be made in miniature size for very small liquid reservoirs, but may be used in any type of reservoir.

It is, therefore an object of this invention to provide a liquid level indicator for enclosed reservoirs.

It is another object of the invention to provide a liquid level indicator that provides a positive identifiable signal.

It is also an object of the invention to provide a liquid level indicator that has a magnetically controlled mechanism for initiating the signal.

It is still another object of the invention to provide a liquid level indicator that can be made in miniature size to fit small liquid reservoir enclosures.

Further objects and advantages of the invention will become more apparent in the light of the following description of the preferred embodiments.

BRIEF DESCRIPTION OF THE DRAWINGS

FIG. 1 is a plan view of a liquid level indicator in a partial section of a reservoir;

FIG. 2 is a front view of a liquid level indicator;

FIG. 5 is a plan view of a magnet carriage for a liquid level indicator;

FIG. 6 is a plan view of a magnet carriage for a liquid level indicator with electrical contact;

FIG. 7 is a front view of FIG. 5;

FIG. 8 is a rear view of FIG. 5;

FIG. 9 is a plan view of a float for a carriage for a liquid level indicator; and FIG. 10 is a cross sectional view on line 10—10 of FIG. 9.

DESCRIPTION OF THE PREFERRED EMBODIMENTS

Figure 4:
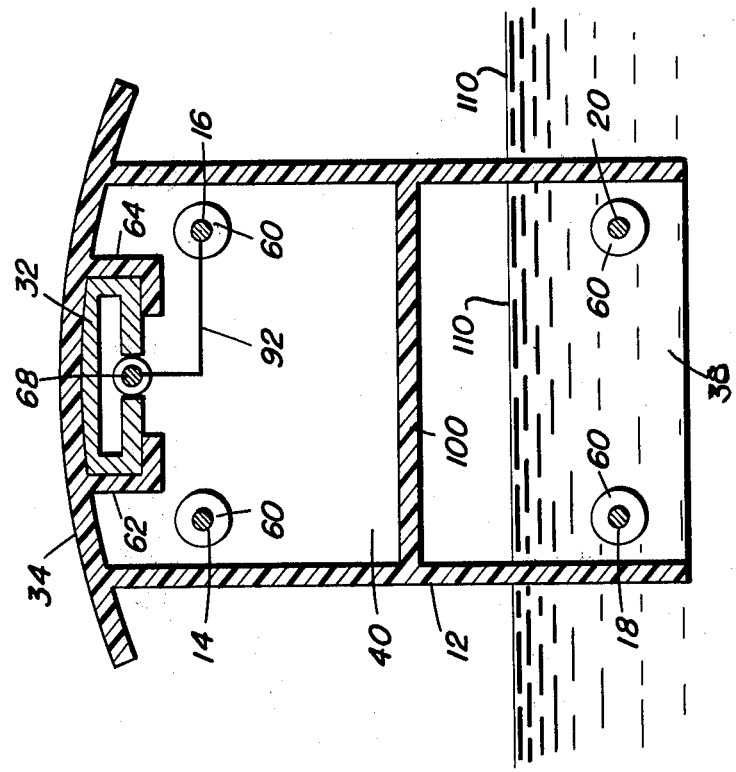
FIG. 4 is a cross sectional view on line 4—4 of FIG. 2.

Referring to the drawings and particularly to FIGS. 1 and 2, a liquid level indicator for a reservoir is shown at 10. The liquid level indicator 10 consists of a housing 12, carriage guide rods 14, 16, 18, and 20, magnet carriage 22 and 24, float 26, carriage magnets 28 and 30, signal or third magnet 32, and electrical connection to be described hereinafter. Magnets 28, 30, and 32 are permanent type magnets.

The housing 12 is configured to fit the interior shape of the reservoir that it is serve, a configured flange 34 to fit the reservoir 36 configuration, shown in partial plan view in FIG. 1 also serves as one side of the liquid level indicator housing 12. The housing 12 may be plastics material or any other non-conductor material. Only plastics has been indicated in the drawings (FIGS. 3 and 4), but it is to be understood that this is for illustration only, and that other non-conductor materials are also intended.

The housing 12 has two distinct areas or compartments, an open portion or compartment 38 which is exposed to the fluid 110 in the reservoir, as shown in FIGS. 1 and 4, and might be termed the "wet side". The other area is a closed portion or compartment 40 which is not exposed to the liquid and might be termed the "dry side". The "wet side" open compartment 38 and the "dry side" closed compartment 40 of housing 12 are shown in relation to each other in FIG. 4.

Two carriages 22 and 24 to carry magnets 28 and 30 are slideably installed on carriage guide rods 14, 16, 18, and 20. Carriage 22 containing magnet 28 on the "wet side" is slideably installed on carriage guide rods 18 and 20, and carriage 24 containing magnet 30 on the "dry side" is slideably installed on carriage guide rods 14 and 16 both as shown in FIG. 3.

Carriage 22 has float 26 affixed to the bottom thereof with an adhesive cement means in such a manner so that the liquid cannot leak into the inside of the float 26. The float 26 as seen in FIGS. 9 and 10 is affixed to the bottom of carriage 22 as shown in FIG. 3 with an adhesive cement along the edges 42.

Figure 3:
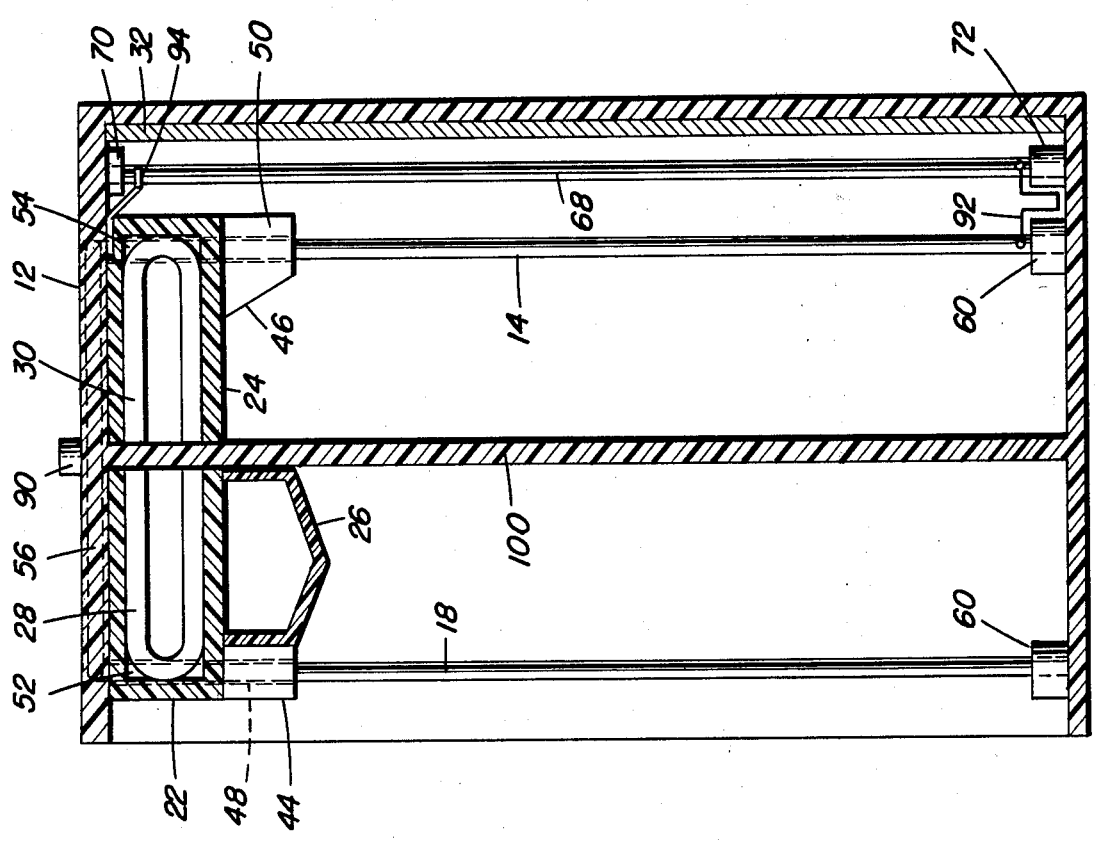
FIG. 3 is a cross sectional view on line 3—3 of FIG. 2.

The magnets 28 and 30 are suitably fastened in place in the carriages 22 and 24, respectively, so that ends of the magnets 28 and 30 are flush with the open sides of the carriages 22 and 24, respectively as shown in FIG. 3.

Carriages 22 and 24 are exactly alike in configuration except that carriage 22 has the float 26 affixed to the bottom as shown in FIG. 3, and carriage 24 has the electrical wiring on the top as shown in FIG. 6 and as described hereinafter. Carriage 22 is depicted in front view in FIG. 7 and rear view in FIG. 8, carriage 24 has the same front and rear configuration.

Each of the carriages 22 and 24 has a pair of leg-like protrusions. (44 for the pair on carriage 22 and 46 for the pair on carriage 24). The protusions 44 and 46 have an aperture there through which also extends through the carriage body, apertures 48 for the protrusions 44 and the body of carriage 22 and apertures 50 for the protrusions 46 and the body of carriage 24.

Carriage 22 has a hollow pocket 52 therein in which the magnet 28 is placed and suitably attached thereto. Carriage 24 has a hollow pocket 54 therein in which the magnet 30 is placed and suitably attached thereto. The hollow pockets 52 and 54 are shown in cross section in FIG. 3.

The carriage 22 is slideably located on metal carriage guide rods 18 and 20. The guide rods 18 and 20 are slideably inserted in the pair of apertures 48. The carriage 24 is slideably located on metal carriage guide rods 14 and 16. The guide rods 14 and 16 are slideably inserted in the pair of apertures 50.

The carriage guide rods 14 and 18 are integrally connected at the top end by a continuation of the rod material in a more or less inverted "U" configuration 56 as shown in FIGS. 1 and 3 with the connecting portion between the guide rods 14 and 18 embedded in the housing 12 material at the top. In a similar manner as shown in FIG. 1 the carriage guide rods 16 and 20 are integrally connected at the top end by an inverted "U" configuration 58 and similarly embedded in the housing 12 material.

At the bottom of guide rods 14, 16, 18, and 20, the said rods are held in place and in plumb vertical alignment by cups 60 as shown in FIGS. 2, 3, and 4. The cups 60 are integral with the bottom of housing 12.

The signal or third magnet 32 is held in place by enclosure arms 62 and 64 as shown in FIGS. 1 and 4. The enclosure arms 62 and 64 are integral with the housing 12.

The liquid level indicator 10 is affixed to the inside wall of the reservoir 36 by machine screws in apertures 66, shown in FIG. 2, in the flanges 34 of the housing 12. It is to be understood that other means of securing the liquid level indicator 10 to the interior of a reservoir, such as by clips, integral formation, hangers, and other means, are within the scope and intent of this invention.

A signal rod 68 is set within the poles of signal magnet 32 as shown in FIGS. 1 and 4. The signal rod 68 is held in place and in alignment between the poles of the signal magnet 32, by a cup-like protrusion 70 at the top and 72 at the bottom of the rod 68 as shown in FIG. 3.

The electrical connection for the liquid level indicator 10 are made through positive terminal 74 and negative terminal 76 as shown in FIG. 1. The terminals are suitably affixed to the exterior of the reservoir 36 by a non-conduction bracket 78.

Flat insulated connectors 80 and 82 connect to the terminals 74 and 76 and pass over the edge of the reservoir 36 as shown in FIG. 1, and are embedded in the gasket of the reservoir cover to make a tight seal. Insulated wires 84 and 86 then connect from the flat insulated connectors 80 and 82 to the terminals 88 and 90, also as shown in FIG. 1. The terminal 88 is connected to the inverted "U" 58 and the terminal 90 is connected to the inverted "U" 56 as shown in FIGS. 1, 2, and 3.

A circuit connection 92 is made from near the bottom of guide rod 16 to near the bottom of signal rod 68 as shown in FIG. 4. A brush-like contact 94, suitably affixed to the top of carriage 24 as shown in FIGS. 1, 3, and 6, makes electrical contact with signal rod 68 as the carriage 24 moves upward and downward on guide rods 14 and 16 during operation of the liquid level indicator 10. This is substantially a wiping type of contact as further described hereinafter for brush-like contacts.

A connector wire 96 connects the brush-like contact 94 to a brush-like contact 98 as shown in FIGS. 1 and 6, also suitably affixed to the top of carriage 24, makes electrical contact with the guide rod 14.

It is to be understood that the brush-like contacts 94 and 98 may have brush-like fingers, a spring-loaded slide, a roller-like contact, or any similar contact surface that "brushes" along the respective rods 68 and 14. Hence the term "brush-like contact", all are within the scope and intent of this invention.

Figure 11:
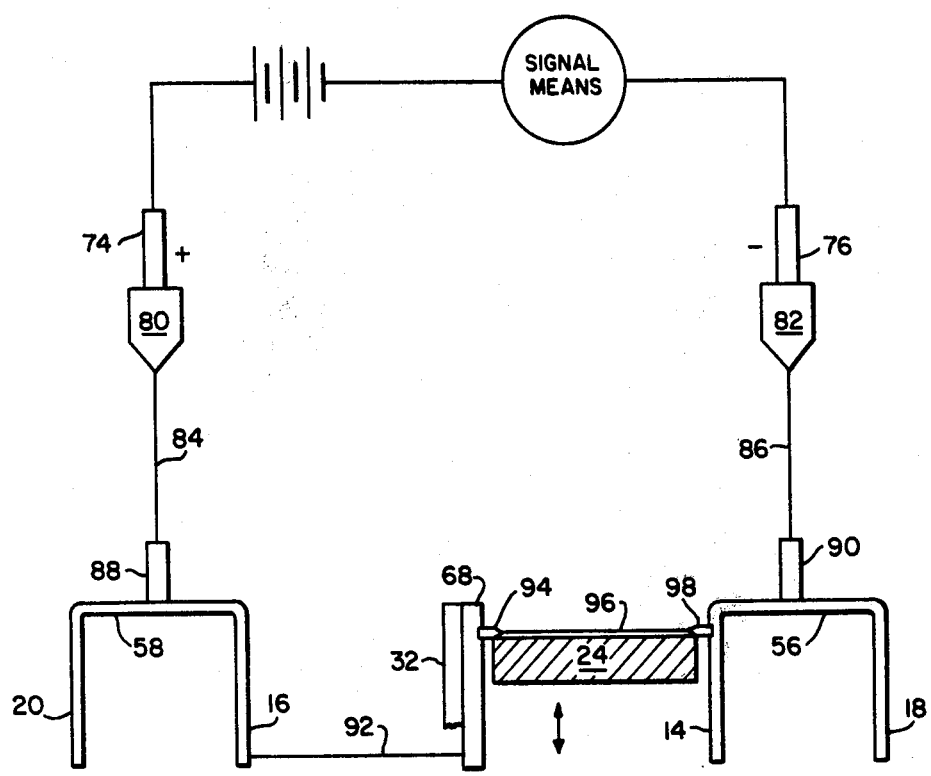
FIG. 11 is a schematic wiring diagram with float carriage 22 not shown.

Thus a complete circuit is established from positive terminal 74 to negative terminal 76 as shown in FIG. 11. The circuit is: terminal 74, to flat connector 80, wire 84, terminal 88, inverted "U" 58, guide rod 16, wire 92, signal rod 68, brush-like contact 94, wire 96, brush-like contact 98, guide rod 14, inverted "U" 56, terminal 90, wire 86, flat connector 82, to negative terminal 76.

Terminals 74 and 76 are connected to a power source and a visual read-out device, such as a gage, for the operator to observe a signal of conditions in the reservoir 36 as hereinafter described.

It is to be noted that the circuit passing through guide rods 14 and 16, as hereinbefore described, will put an electrical charge on guide rods 18 and 20 through their connections with the inverted "U" connections 56 and 58 respectively, which in turn are integrally connected to guide posts 14 and 16 respectively. If the liquid in the reservoir 36 is of a conductive nature, then guide rods 18 and 20 cannot be connected to the inverted "U" connections 56 and 58 as this would cause a short circuit. In this case the guide rods 18 and 20 will be held in position and alignment at their upper ends by a cup-like retainer similar to cup 60, so as to have no connection to guide rods 14 and 16 through the inverted "U" connections 56 and 58 respectively. As noted hereinbefore, guide rods 18 and 20 are immersed in the liquid in the reservoir 36 on the "wet side".

As to the operation of the liquid level indicator 10, the operation is described hereinafter. When the liquid level in the reservoir is at the maximum or "full", the float 26 will lift the attached carriage 22 to the top of the guide rods 18 and 20.

The magnet 28 within the carriage 22 will align its lines of magnetic force from its poles through the housing wall 100 to mate with and attract to the lines of magnetic force from the poles of the magnet 30 within the carriage 24. The poles of magnets 28 and 30 must be so aligned at assembly and fabrication so that the magnets 28 and 30 attract each other and do not repel each other.

As the carriage 22 positions itself by floating on the liquid in the reservoir 36 as hereinbefore described, it holds carriage 24 in a relative position by the magnetic attraction, also as hereinbefore described. Carriage 24 is slideably located on the guide rods 14 and 16 to the relative position of the carriage 22.

As the liquid level changes in the reservoir 36, the carriage 22 on its float 26 also changes. As carriage 22 changes location, carriage 24 also changes location as the magnetic lines of force from the magnets 28 and 30 keep the the two carriages 22 and 24 in a relative position to each other.

When the carriage 24 moves up and down the guide rods 14 and 16 as the liquid level changes in the reservoir 36, the brush-like contact 94 concurrently moves up and down the signal rod 68. In a similar manner the brush-like contact 98 concurrently moves up and down the guide rod 14 as the carriage 24 moves. Thus, brush-like contacts 94 and 98 move up or down their respective rods 68 and 14 concurrently.

Through the aforemention electrical circuit, the movement of the brush-like contact 94 on signal rod 68 relays and produces a changing read-out signal on the aforementioned visual read-out device. This changing signal is caused by the magnetic effect of the signal magnet 32 on the signal rod 68. The effect is to change the equivalent resistance in the signal rod 68 and interfere with the current flow therein and thus reflect this in the read-out signal. It is to be noted that if the floating carriage 22 drops due to the loss of fluid in the reservoir 36, carriage 24 also drops in phase therewith so as to insure the signal effect occurring at a predetermined level, for example, with twenty-five (25) percent of the liquid being in the reservoir 36. This system is, therefore, arranged to give a warning by either an acoustic or an electrical signal, or by means of a gauge visual read-out, so that a sufficient time period will be given to the operator for refilling the reservoir 36 and thus provide a good margin of safety. This can be also accomplished by arranging for the permanent magnet gap to be designed wider from a desired designated point to the bottom of the signal rod 68.

When the floating carriage 22 is at the very top, because of a full reservoir, carriage 24 is also at the top and thus the passage of current is through the entire magnetically affected signal rod 68. At this condition the read-out will indicate "full". As the liquid level drops in the reservoir, the carriages 22 and 24 descend and the passage of current is through only a portion of the magnetically affected signal rod 68. At this latter condition the read-out signal indicates something less than "full", depending upon the exact location. If the floating carriage 22 drops to the bottom because of an empty reservoir, carriage 24 also drops to the bottom and the passage of current is essentially direct without any magnetic affect and the read-out will signal "empty".

It is to be understood that the visual read-out or signal may be merely a light or buzzer, rather than a gage type read-out. Such variations are within the scope and intent of this invention.

As can be readily understood from the foregoing description of the invention, the present structure can be configured in different modes to provide the ability to indicate the level of a liquid in a reservoir.

Accordingly, modifications and variations to which the invention is susceptible may be practiced without departing from the scope and intent of the appended claims.

What is claimed is:

1. A liquid level indicator for a reservoir for liquids, comprising:
    a housing means, said housing means having an open compartment exposed to liquid in a reservoir and an enclosed compartment not exposed to liquid in said reservoir, said housing means being suitably affixed to the inside surface of a wall of said reservoir;
    a floating carriage means, said floating carriage means being retained within said open compartment and in contact with said liquid;
    an indicator carriage means, said indicator carriage means being retained with said enclosed compartment and not exposed to said liquid;
    a first permanent magnet means, said first permanent magnet means being affixed to said floating carriage means;
    a second permanent magnet means, said second permanent magnet means being affixed to said indicator carriage means;
    a third permanent magnet means, said third permanent magnet means being affixed within said enclosed compartment;
    two pairs of guide rods, said two pairs of guide rods consisting of a first pair of guide rods affixed within said open compartment and connected to a first terminal means, and a second pair of guide rods affixed within said enclosed compartment and connected to a second terminal means, said floating carriage means being retained in said open compartment by being slidably mounted on said first pair of guide rods, said indicator carriage means being retained in said enclosed compartment by being slidably mounted on said second pair of guide rods;
    a power source, said power source being external to said liquid level indicator and said reservoir;
    a signal means, said signal means being external to said liquid level indicator and said reservoir, said signal means being gauge-like;
    an electrical circuit means, said electrical circuit means being within said enclosed compartment, said electrical circuit means having connections on exterior of said enclosed compartment and extending to exterior of said reservoir and connected to said power source and to said signal means and additionally connected to said first and second terminal means, said electrical circuit means within said enclosed compartment having a rod-like element as an electrically connected part thereof affixed within the field of the magnetic lines of force of said third permanent magnet means.

2. The liquid level indicator as recited in claim 1, wherein said first permanent magnet means is affixed to said floating carriage means and magnetically attracts said second permanent magnet means affixed to said indicator carriage means so as to maintain said indicator means slidably located on said second pair of guide rods at a comparable level to said floating carriage means slidably located on said first pair of guide rods.

3. The liquid level indicator as recited in claim 2, and additionally, a first contact means, said first contact means affixed to said indicator carriage means as part of said electrical circuit means within said enclosed compartment, said first contact means making electrical contact with said rod-like element affixed within said field of magnetic lines of force of said third permanent magnet means.

4. The liquid level indicator as recited in claim 3, and additionally, a second contact means, said second contact means affixed to said indicator carriage means as part of said electrical circuit means within said enclosed compartment, said second contact means being electrically connected to said first contact means, said second contact means making electrical contact with one of said second pair of guide rods.

5. The liquid level indicator as recited in claim 3, wherein said electrical circuit means varies resistance through said rod-like element by location of said first contact means being positioned against said rod-like element, said location of said first contact means being determined by location of said floating carriage means on said liquid, said first permanent magnet means being affixed to said floating carriage means, thereby determining location of indicator carriage means by influencing said second permanent magnet means located therein, with said first contact means being affixed to said indicator carriage means, thereby determining position of said first contact means against said rod-like means.

6. The liquid level indicator as recited in claim 5, wherein said rod-like element affixed within said field of said magnetic lines of force of said third permanent magnet means has resistance thereof incrementally determined along the lineal length thereof by location of said first contact means.

7. The liquid level indicator as recited in claim 6, wherein resistance within said electrical circuit means, as determined by location of said first contact means on said rod-like element and incorporated in said electrical circuit means, is recorded on said read-out signal read-out means.

8. The liquid level indicator as recited in claim 1 wherein said housing means is constructed of a non-conductive material.

* * * * *